(12) United States Patent
Huart et al.

(10) Patent No.: US 7,099,820 B1
(45) Date of Patent: Aug. 29, 2006

(54) METHOD AND APPARATUS FOR CONCEALING JITTER BUFFER EXPANSION AND CONTRACTION

(75) Inventors: Pascal H. Huart, Dallas, TX (US); Luke K. Surazski, San Jose, CA (US); Richard A. Dunlap, Euless, TX (US); Jeffrey A. Connelly, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 816 days.

(21) Appl. No.: 10/076,931

(22) Filed: Feb. 15, 2002

(51) Int. Cl.
*G10L 11/04* (2006.01)
*G10L 21/00* (2006.01)
*G10L 19/00* (2006.01)

(52) U.S. Cl. .................. 704/207; 704/270; 704/270.1; 704/275; 704/201; 370/252; 370/356; 370/352

(58) Field of Classification Search ........ 370/200–916; 704/270.1, 501, 503–4, 201, 207, 270, 275; 379/211; 455/403
See application file for complete search history.

(56) References Cited

U.S. PATENT DOCUMENTS

| | | | |
|---|---|---|---|
| 5,157,728 A * | 10/1992 | Schorman et al. .......... 704/502 |
| 5,699,481 A | 12/1997 | Shlomot et al. ........... 395/2.37 |
| 5,991,339 A | 11/1999 | Bazes et al. ................ 375/232 |
| 6,377,931 B1 | 4/2002 | Shlomot ..................... 704/503 |
| 6,452,950 B1 * | 9/2002 | Ohlsson et al. ............. 370/516 |
| 6,658,027 B1 * | 12/2003 | Kramer et al. .............. 370/516 |
| 6,665,317 B1 * | 12/2003 | Scott ......................... 370/516 |
| 6,683,889 B1 * | 1/2004 | Shaffer et al. .............. 370/516 |
| 6,687,360 B1 * | 2/2004 | Kung et al. ............ 379/211.02 |
| 6,747,999 B1 * | 6/2004 | Grosberg et al. ........... 370/516 |
| 6,859,460 B1 * | 2/2005 | Chen ......................... 370/516 |
| 6,862,298 B1 | 3/2005 | Smith et al. ................ 370/516 |
| 2002/0064158 A1 * | 5/2002 | Yokoyama et al. ......... 370/394 |
| 2002/0145999 A1 * | 10/2002 | Dzik ......................... 370/352 |
| 2003/0026275 A1 * | 2/2003 | Lanzafame et al. ........ 370/412 |
| 2004/0120309 A1 * | 6/2004 | Kurittu et al. .............. 370/352 |

* cited by examiner

*Primary Examiner*—Richemond Dorvil
*Assistant Examiner*—Thomas E. Shortledge
(74) *Attorney, Agent, or Firm*—Baker Botts L.L.P.

(57) ABSTRACT

Methods for concealing audible distortions resulting from changes in jitter buffer size include receiving an audio stream, storing the audio stream in a jitter buffer, and determining a pitch period associated with the audio stream. To expand the jitter buffer, a method includes inserting additional audio data that has a duration corresponding to an integer multiple of the pitch period into the audio stream. To contract the jitter buffer, a method includes removing a portion of the audio stream having a duration corresponding to an integer multiple of the pitch period.

22 Claims, 4 Drawing Sheets

METHOD AND APPARATUS FOR CONCEALING JITTER BUFFER EXPANSION AND CONTRACTION

TECHNICAL FIELD OF THE INVENTION

This invention relates generally to audio communication, and more particularly to a method and apparatus for concealing jitter buffer expansion and contraction.

BACKGROUND OF THE INVENTION

Voice-over-packet technology has become prevalent in recent years. One drawback of voice-over-packet technologies is that network performance can become unreliable due to component failure, network delays, and a variety of other factors. To compensate for this variance in network performance, many voice communication systems include a jitter buffer which stores information before playback, allowing time for packets to arrive. The jitter buffer size can be modified as necessary based on changes in network jitter. However, changing the size of the jitter buffer during playback may produce audible distortions.

SUMMARY OF THE INVENTION

In accordance with the present invention, techniques for concealing the audible signs of jitter buffer expansion and contraction are provided. In accordance with the present invention, the disadvantages and problems associated with changing the size of the jitter buffer in response to network jitter changes have been substantially reduced or eliminated.

In accordance with one embodiment of the present invention, a communication apparatus includes a network interface, a memory, a processor, a packet loss concealment module, and a user interface. The network interface receives an audio stream, and a memory stores the audio stream in a jitter buffer. The processor determines a pitch period for the audio stream, and also determines whether the capacity of the jitter buffer needs to be increased. The packet loss concealment module adds additional audio data having a duration equal to an integer multiple of the pitch period to the audio stream to conceal expansion of the jitter buffer. A user interface presents the modified audio stream to a user.

In accordance with another embodiment of the present invention, a communication apparatus includes a network interface, a memory, a processor and a user interface. The network interface receives an audio stream, and the memory stores the audio stream in a jitter buffer. The processor determines a pitch period for the audio stream, and determines whether the capacity of the jitter buffer can be decreased. If the capacity of the jitter buffer can be decreased, the processor removes a portion of the audio stream having a duration equal to an integer number of pitch periods, and presents the modified stream to a user using the user interface.

Important technical advantages of the present invention include clearer and more accurate recreation of audio conversations. Certain embodiments of the present invention may be incorporated into existing hardware and software. Numerous other technical advantages will be apparent to one skilled in the art.

Particular embodiments of this invention may include some, all, or none of the same advantages. The technical advantages of the present invention can be best understood with reference to the following detailed description, figures and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
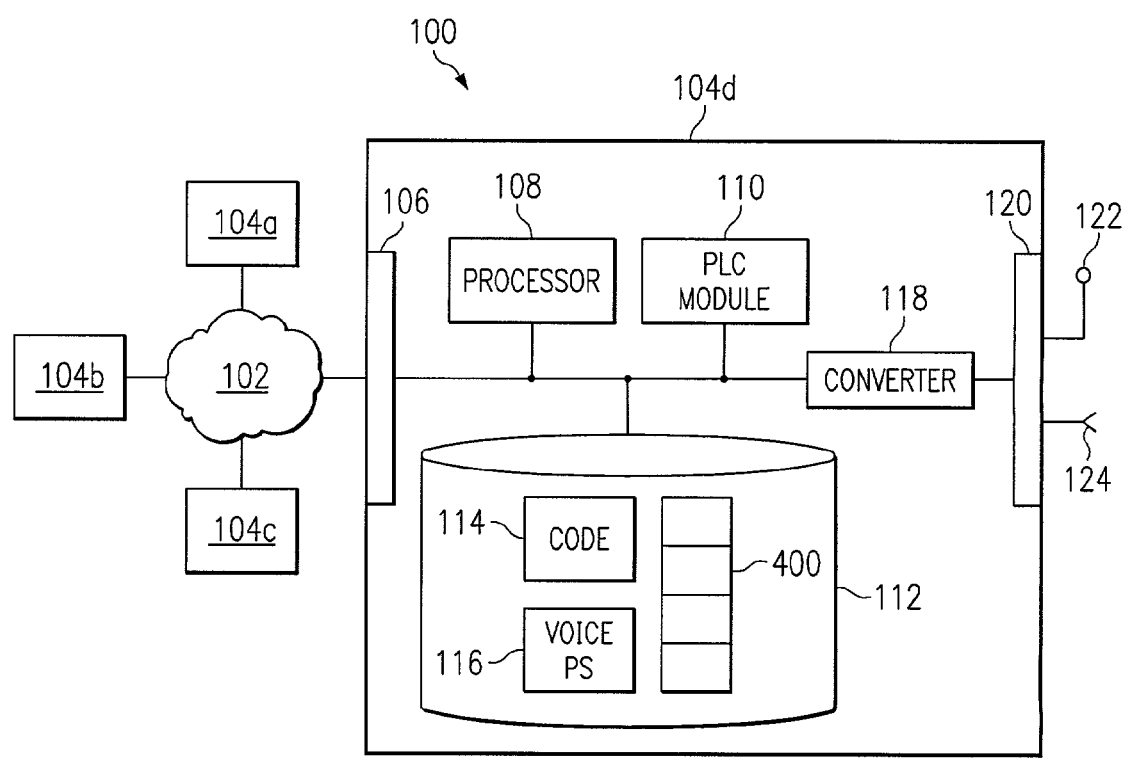
FIG. 1 illustrates a communication system in accordance with the present invention.

FIG. 1 illustrates a communication system 100 that includes a number of network endpoints 104a, 104b, 104c, and 104d (generally referred to as endpoints 104) coupled by a network 102. In general, endpoints 104 exchange voice, video, data, and other information (generally referred to as media) using network 102. Endpoint 104d shows an expanded view illustrating components of an exemplary network endpoint 104. Endpoints 104 may include a jitter buffer to account for performance variations in network 102, and may implement techniques to reduce audio disruption during modifications of jitter buffer size.

Network 102 may be a local area network (LAN), a wide area network (WAN), the Internet, or other similar network that transmits packets of media. Network 102 carries data in packets, cells, frames, or other segments, generally referred to as packets. Network 102 may include routers, switches, hubs, gateways or any other suitable collection of hardware and/or software. Network 102 may be an Internet protocol (IP) network, a frame relay network, an asynchronous transfer mode (ATM) network, a synchronous optical network (SONET), or any other network which can transmit packets, including any configuration of more than one of the networks described above. Network 102 may also be coupled to a non-packet-based network, such as a private branch exchange (PBX), the public switched telephone network (PSTN), or a wireless network.

Endpoints 104 include any suitable collection of hardware and/or software that provides communication services to a user. For example, endpoints 104 may be telephones, computers running telephony software, video monitors, cameras, or any other communication or processing hardware and/or software that supports the communication of media packets using network 102. Endpoints 104 may also include unattended or automated systems, gateways, or other intermediate components that can establish media sessions.

In a particular embodiment, endpoint 104d includes a processor 108, a packet loss concealment (PLC) module 110, a memory 112, a network interface 106, a converter 118, and a user interface 120. Endpoint 104d may also include hardware for sending and receiving audio communications to and from a user, for example, a microphone 122 and a speaker 124.

Network interface 106 represents any connection or port, virtual or real, direct or indirect, that enables endpoint 104 to communicate an audio stream with network 102. Network interface 106 receives audio streams from network 102 and delivers those streams to processor 108 for processing.

Network interface 106 may also communicate audio data received from a user via microphone 122 to network 102. User interface 120 communicates streams of audio to an output device, such as speaker 124, enabling the audio stream to be heard by a user.

Memory 112 may be any form of volatile or nonvolatile memory, such as magnetic media, optical media, random access memory (RAM), read only memory (ROM), removable media, or any other suitable local or remote memory component. Memory 112 stores code 114 for execution by processor 108. Memory 112 also stores voice parameters 116. Voice parameter 116 may include a pitch period, a frequency, or any other parameter to characterize an audio stream. Voice parameters 116 are accessible by processor 108 and PLC module 110. Memory 112 also includes a jitter buffer 400 which stores audio streams before the audio streams are communicated for presentation to a user of endpoint 104d.

Processor 108 may be a microprocessor, a microcontroller, a digital signal processor (DSP), any other suitable combination of hardware and/or software configured to process information. Processor 108 manages the overall operation of network endpoint 104d, including the management and processing of audio streams received by endpoint 104d. In a particular embodiment, processor 108 may perform an autocorrelation calculation on an audio stream to determine a pitch period or other voice parameter 116. In an alternative embodiment, processor 108 can receive voice parameters 116 from other endpoints 104.

Packet loss concealment (PLC) module 110 receives audio data before it is presented to user. When the audio data indicates that a packet has been lost, PLC module 110 uses voice parameters 116 to construct an appropriate insertion for the audio stream. PLC module 110 may replicate, attenuate, or perform any other suitable processing on the audio stream to avoid incongruity between the modified audio stream and ordinary speech. In a particular embodiment, PLC module 110 gradually reduces the amplitude of inserted audio data as the duration of the insertion increases. PLC module 110 communicates with converter 118, which includes any combination of hardware and/or software that can convert digital streams of audio data into a signal suitable for presentation to a user of endpoint 104 using user interface 120 and speaker 124.

In operation, network endpoints 104a, 104b, and/or 104c communicate voice packets through network 102 to network endpoint 104d. In a particular embodiment, network endpoints 104a, 104b, and 104c may establish a control channel, such as a real time control protocol (RTCP) channel to direct packets through network 102.

Endpoint 104d receives packets from endpoints 104a, 104b, and/or 104c using network interface 106. Processor 108 stores the audio stream in jitter buffer 400 and may also store received voice parameters 116 calculated by endpoints 104a, 104b, and/or 104c in memory 112. Alternatively, processor 108 may calculate voice parameter 116, for example by using an autocorrelation calculation on the audio stream, and may store parameter 116 in memory 112. Processor 108 determines a pitch period for the audio stream using parameter 116, which may be the pitch period itself or may be another characteristic (e.g., frequency) that may be used to determine the pitch period.

Processor 108 monitors conditions in network, typically by measuring one or more network parameters, such as delay in receiving packets, number of packets dropped, or other network condition. Based on the monitored parameters, processor 108 determines an optimal or desired size of jitter buffer 400. For example, processor 108 might calculate a size based on a mean delay time in network 102 and a variance in the delay time of network 102. One goal of jitter buffer 400 is to collect as many delayed packets as possible in order to preserve the integrity of the audio stream. However, the size of jitter buffer 400 inherently introduces a delay in transmission of audio streams to the user. This delay is known as latency. The size of jitter buffer 400, therefore, represents a trade-off between accuracy and latency of the audio stream.

Processor 108 may modify the size of jitter buffer 400 to the optimal size by expanding or contracting jitter buffer 400. To expand jitter buffer 400, processor 108 adds additional capacity having a duration equal to an integer number of pitch periods, effectively creating spaces without data in the audio stream. To contract jitter buffer 400, processor 108 removes from the audio stream a portion having a duration equal to a integer multiple of the pitch period.

Processor 108 also continuously passes the contents of jitter buffer 400 to packet loss concealment (PLC) module 110. PLC module 110 fills in spaces in the audio stream where a packet is lost or missing due to network jitter. PLC module 110 may also insert additional audio data into spaces in the jitter buffer 400 created by expansion. Because these spaces have a duration equal to an integer number of pitch periods, the additional audio data will match well with the received audio stream.

Figure 2:
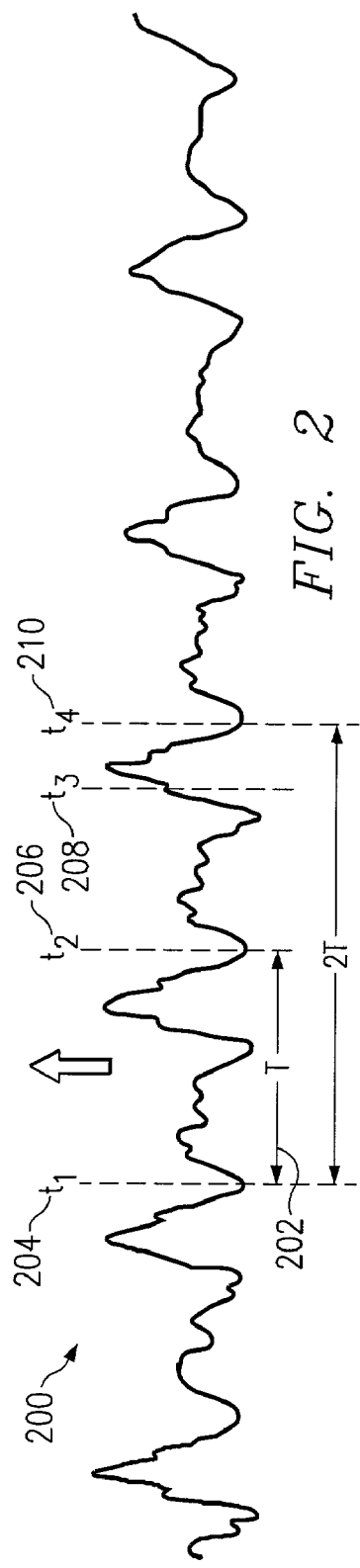
FIG. 2 depicts a waveform representing a contracted audio stream.
Figure 3:
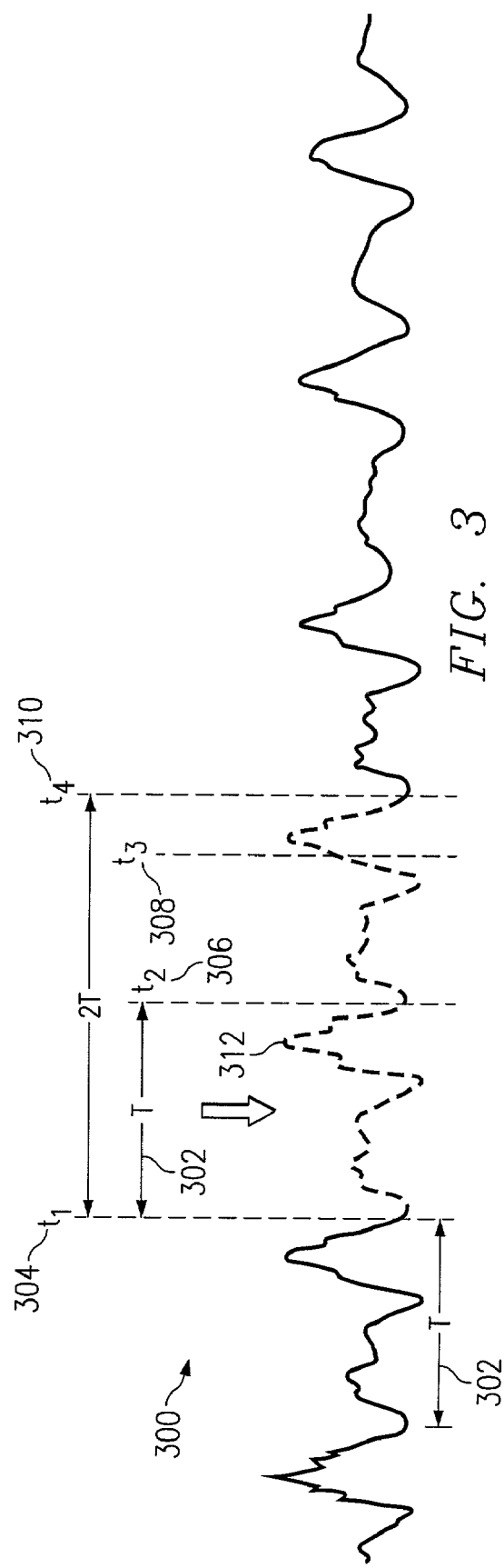
FIG. 3 is a waveform representing an expanded audio stream.

After PLC module 110 modifies the audio stream, converter 118 converts the audio stream into a suitable format for playback to the user of endpoint 104d using speaker 124 of user interface 120. In the case where jitter buffer 400 has been contracted, the playback will manifest an audible distortion if the removed portion of the audio stream has a duration that does not correspond closely with an integer multiple of the pitch period. Similarly, if jitter buffer 400 was expanded by an amount that does not correspond closely with an integer number of the pitch period, playback will manifest an audible distortion resulting from a mismatch between the data inserted by PLC module 110 and the received audio stream. FIGS. 2 and 3 illustrate the reason for these distortions.

FIG. 2 shows a waveform 200 with a characteristic pitch period 202 denoted as "T." Waveform 200 represents a stream of audio data stored in a jitter buffer. To contract the jitter buffer, endpoint 104 removes part of waveform 200. Endpoint 104 removes a portion of the waveform corresponding to an integer multiple of pitch period T 202 so that the resulting waveform 200 may be played back without an audible distortion.

In one example, the portion of waveform 200 between time $t_1$ 204 and time $t_2$ 206 is removed. Because there is a consistent and repeating pattern over each pitch period T 202 in waveform 200, removal of the portion of waveform 200 between $t_1$ 204 and $t_2$ 206 does not produce an audible distortion during playback of waveform 200. In contrast, removing the portion of waveform 200 between $t_1$ 204 and $t_3$ 208 leaves an irregular portion of waveform 200 between $t_3$ 208 and $t_4$ 210. Because the irregular portion of waveform 200 does not fit into the repeating pattern of waveform 200, removal of the portion of waveform 200 between $t_1$ 204 and $t_3$ 208 produces an audible distortion during playback.

Endpoint 104 may also remove more than one pitch period at a time from the audio stream, such as removing the portion of waveform 200 between time $t_1$ 204 and time $t_4$ 210. Because of the repeating pattern of waveform 200, removing an integer multiple of the pitch period T 202 (2T in this case) does not produce an audible distortion during playback of waveform 200. When removing multiple pitch periods, endpoint 104 may perform the removal in steps, removing a smaller portion of the audio stream with a duration of one or two pitch periods in each step. Endpoint 104 may remove data from the beginning, middle or end of the audio stream, so long as the duration removed corresponds to an integer multiple of the pitch period.

FIG. 3 shows a waveform 300 with a characteristic pitch period T 302, representing an audio stream stored in a jitter buffer. PLC module 110 inserts additional audio data 312, shown by a dashed curve, into waveform 300. Because additional audio data 312 is generated using the pitch period T 302 of waveform 300, additional audio data 312 matches the repeating pattern of waveform 300 so long as the duration of additional audio data 312 corresponds to an integer multiple of the pitch period T 302. Thus, additional audio data 312 having a duration from $t_1$ 304 to $t_2$ 306 or $t_4$ 310 may be added without producing a distortion during playback.

In contrast, if additional audio data 312 has a duration that does not correspond to an integer multiple of the pitch period T 302 or if additional audio data 312 is generated with a pitch period that does not match pitch period T 302 of waveform 300, then adding additional audio data 312 will produce an audible distortion during playback of waveform 300. For example, if the portion of additional audio data 312 between $t_1$ 304 and $t_3$ 308 is added into waveform 300, the additional audio data 312 does not match the pattern of waveform 300, and this mismatch produces an audible distortion.

Although one example of additional audio data 304 is shown, numerous variations will be apparent to one skilled in the art. For example, endpoint 104 could insert additional audio data 304 having a duration of multiple pitch periods T 302, such as the portion of additional audio data 312 between $t_1$ 304 and $t_2$ 306. When inserting multiple pitch periods T 302, endpoint 104 may insert the additional audio data 312 all at once or in a series of steps with each insertion having a duration of a few pitch periods T 302. Endpoint 104 may insert the additional audio data 304 into different parts of the audio stream, such as the beginning, middle or end. It should be understood that these variations do not represent a substantial departure from the method described.

Figure 4A:
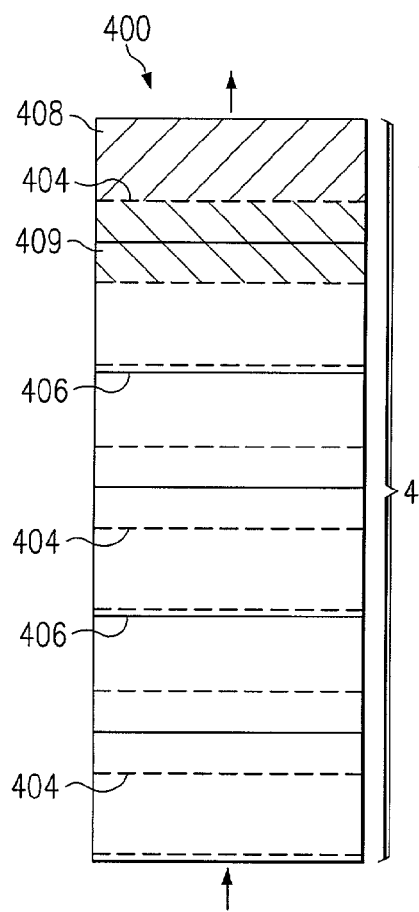
FIGS. 4A, 4B, and 4C show jitter buffer expansion and contraction.

FIG. 4A illustrates a jitter buffer 400 storing a portion of a continuous stream of audio data 402. Endpoint 104 assembles audio data 402 from a collection of packets received by endpoint 104. Solid lines 406 show the division of audio data 402 by packet, but it is understood that once data 402 has been introduced into jitter buffer 400, the stream is continuous and can be processed at any resolution that processor 108 can support. Audio data 402 can also be divided into time increments corresponding to the pitch period as shown by dashed lines 404. This allows processor 108 to process audio data 402 from the audio stream in pitch-period-sized increments, represented by sections 408 and 409. Section 408 represents the next pitch-period-sized increment of audio data 402 in jitter buffer 400 that is ready for communication to elements of endpoint 104 for eventual presentation to the user.

Figure 4B:
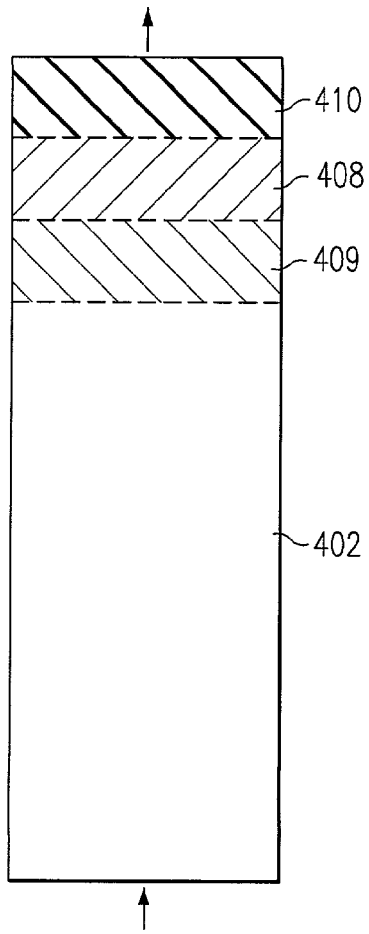

FIG. 4B shows an expanded jitter buffer 400. In this case, processor 108 determines that the capacity of jitter buffer 400 is less than optimal and expands jitter buffer 400 by adding space 410 having a duration equal to an integer number of pitch periods to audio data 402 at the beginning of the audio stream. In a particular embodiment, processor 108 may communicate the contents of jitter buffer 400 to a PLC module 110, which fills space 410 with additional audio data. In the case shown, processor 108 adds space 410 to the beginning of the audio stream, but processor 108 may also add data to the end of the audio stream, in the middle of the audio stream, or at any other location. Since PLC module 110 receives timely information on pitch period and the inserted space has a duration equal to an integer number of pitch periods, PLC module 110 will be able to fill space 410 with accurate audio data. In a particular embodiment, space 410 may be placed to capture silence periods advantageously so that PLC module 110 generates less audio data overall.

Figure 4C:
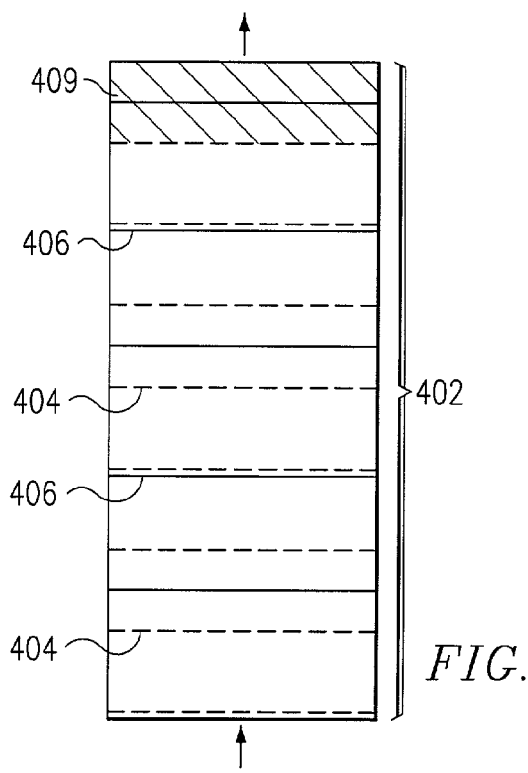

FIG. 4C shows jitter buffer 400 after contraction by processor 108. Contracted jitter buffer 400 represents jitter buffer 400 after a pitch period size portion of audio data 402, corresponding to section 408, has been removed from jitter buffer 400. Since the size of section 408 was an integer multiple of a pitch period, audio data 402 produces little or no audible distortion during playback. Alternatively, processor 108 could have removed both section 408 and section 409, because the total amount of audio data 402 removed would have been equal to an integer multiple of pitch periods.

Figure 5:
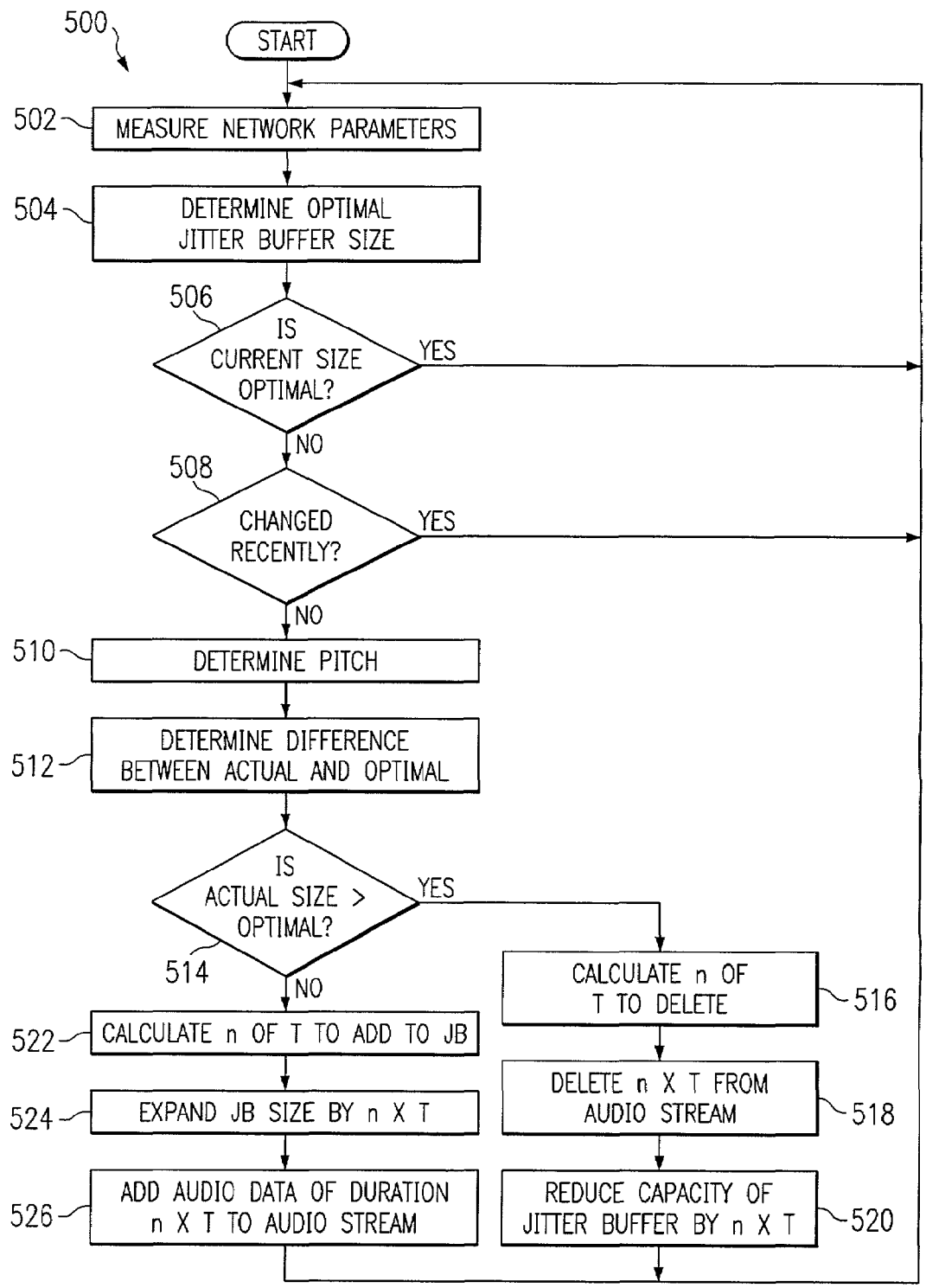
FIG. 5 illustrates a flowchart of a method to conceal jitter buffer expansion and contraction.

FIG. 5 illustrates a flowchart 500 showing a particular process for expanding and contracting jitter buffer 400. During the process of expansion and contraction, endpoint 104 constantly receives new audio data and plays audio back to a user, and the described method allows the playback to go on continuously without audible distortion due to expansion and contraction.

Endpoint 104 monitors one or more network parameters at step 502. Endpoint 104 then determines an optimal jitter buffer size based on the network parameter or parameters at step 504. In a particular embodiment, endpoint 104 may perform steps 502 and 504 continuously and/or during performance of later steps in order to update the optimal jitter buffer size in real time.

Endpoint 104 determines if the current jitter buffer size is optimal at step 506. If the current size is optimal, endpoint 104 continues monitoring network parameters at step 502. If the current size is not optimal, endpoint 104 determines whether the size of the jitter buffer has been modified recently at step 508. Because multiple modifications of the jitter buffer in rapid succession can produce audible distortions during playback, endpoint 104 waits for a specified period of time between successive modifications of jitter buffer size. The time spent waiting should be sufficiently long to prevent audible distortions, but not so long that the modifications of the jitter buffer lag far behind changes in network parameters. For example, separating modifications of the jitter buffer by about 100 pitch periods (if one has been determined) or 2 seconds usually suffices to prevent distortion from repeated modifications while still allowing reasonable responsiveness to changes in network parameters. However, the method contemplates any suitable delay time between modifications. During the delay time, endpoint 104 may continue monitoring network parameters at step 502 and updating the optimal jitter buffer size at step 504.

Once sufficient time has elapsed between the last modification, endpoint 104 may modify the jitter buffer size. To modify the size of the jitter buffer, endpoint 104 determines a pitch period or other appropriate voice parameter that can be used to derive the pitch period at step 510. Endpoint 104 determines the difference between the actual size of the jitter buffer and the optimal size of the jitter buffer at step 512. If the actual size of the jitter buffer is greater than the optimal size of the jitter buffer at step 514, endpoint 104 calculates a number of pitch periods to delete at step 516. The number of pitch periods may be subject to a maximum possible amount, such as three, that may be deleted at one time in order to preserve the quality of the audio stream. Next, at step 518, endpoint 104 deletes an integer number (n) of pitch periods T from the audio stream. Endpoint 104 reduces the capacity of jitter buffer 400 by a corresponding amount at step 520. Endpoint 104 then continues monitoring network parameters at step 502, and modifying jitter buffer size accordingly.

If the actual size of jitter buffer 400 is less than the optimal size at step 514, endpoint 104 calculates an integer multiple of the pitch period T to add to the capacity of jitter buffer 400 at step 522. There may be a maximum number of pitch periods to be added, such as three, to preserve audio quality. Endpoint 104 expands the size of the jitter buffer 400 by the calculated number of pitch periods at step 524. Since space in the jitter buffer is created by the expansion, PLC module 110 adds audio data of a corresponding duration to the audio stream at step 526. Endpoint 104 then continues monitoring network parameters at step 502, and modifying the size of jitter buffer as necessary.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for concealing audible distortions resulting from jitter buffer expansion, comprising:
    receiving an audio stream;
    determining a pitch period associated with the audio stream;
    storing the audio stream in a jitter buffer comprising a capacity;
    increasing the capacity of the jitter buffer by an integer multiple of the pitch period;
    inserting additional audio data in the audio stream, the additional audio data having a duration corresponding to the integer multiple of the pitch period;
    determining if the increase in the capacity of the jitter buffer exceeds a selected number of pitch periods;
    if the increase exceeds the selected number of pitch periods, inserting the additional audio data in more than one step, each step comprising inserting a portion of additional audio data having a duration no more than the selected number of pitch periods; and
    communicating the audio stream for presentation to a user.

2. The method of claim 1, wherein the method further comprises receiving a voice parameter calculated at a remote location, and the pitch period is determined from the voice parameter.

3. The method of claim 1, wherein the method further comprises:
    calculating a minimum increase in the capacity of the jitter buffer based on network parameters; and
    increasing the capacity of the jitter buffer by a least integer multiple of the pitch period greater than the minimum increase.

4. The method of claim 1, wherein the additional audio data is attenuated in amplitude as the duration of the additional audio data increases.

5. The method of claim 1, wherein the steps are performed by logic embodied in a computer readable medium.

6. A communication apparatus, comprising:
    a network interface operable to receive from a source an audio stream;
    a memory operable to store the audio stream in a jitter buffer comprising a capacity;
    a processor operable to determine a pitch period associated with the audio stream, to increase the capacity of the jitter buffer by an integer multiple of the pitch period, to determine if the increase in the capacity of the jitter buffer exceeds a selected number of pitch periods, and if the increase exceeds the selected number of pitch periods, to insert additional audio data in more than one step, each step comprising inserting a portion the additional audio data having a duration no more than the selected number of pitch periods;
    a packet loss concealment module operable to add the additional audio data to the audio stream for a duration corresponding to the integer multiple of the pitch period; and
    a user interface operable to communicate the audio stream for presentation to the user.

7. The communication apparatus of claim 6, wherein the processor is further operable to apply an autocorrelation calculation to the voice samples to determine the pitch period.

8. The communication apparatus of claim 6, wherein the network interface is further operable to receive a voice parameter from the source and the processor is further operable to determine the pitch period from the voice parameter.

9. The communication apparatus of claim 6, wherein the processor is further operable to determine a minimum increase in the capacity of the jitter buffer and to increase the capacity of the jitter buffer by a least integer multiple of the pitch period greater than the minimum increase.

10. A method for concealing audible distortions resulting from jitter buffer contraction, comprising:
    receiving an audio stream;
    determining a pitch period associated with the audio stream;
    storing the audio stream in a jitter buffer comprising a capacity;
    removing a portion of the audio stream having a duration corresponding to an integer multiple of the pitch period;
    decreasing the capacity of the jitter buffer by the integer multiple of the pitch period;
    determining if the decrease in the capacity of the jitter buffer exceeds a selected number of pitch periods;
    if the decrease in the capacity exceeds the selected number of pitch periods, removing the portion of the audio stream in a series of steps, each step comprising removing a duration no greater than the selected number of pitch periods; and
    communicating the audio stream for presentation to a user.

11. The method of claim 10, wherein the method further comprises receiving a voice parameter calculated at a remote location, and the pitch period is determined from the voice parameter.

12. The method of claim 10, wherein the method further comprises determining a maximum decrease in the capacity of the jitter buffer based on a change in network parameters, and the duration of the removed portion of the audio stream is a greatest integer multiple of the pitch period that is less than the maximum decrease.

13. The method of claim 10, wherein the steps are performed by logic embodied in a computer readable medium.

14. A communication apparatus, comprising:
a network interface operable to receive an audio stream;
a memory operable to store the audio stream in a jitter buffer comprising a capacity;
a processor operable to determine a pitch period for the audio stream, to remove a portion of the audio stream having a duration corresponding to an integer multiple of the pitch period, to decrease the capacity of the jitter buffer by the integer multiple of the pitch period, to determine if the decrease in the capacity of the jitter buffer exceeds a selected number of pitch periods, and if the decrease in the capacity exceeds the selected number of pitch periods, to remove the portion of the audio stream in a series of steps, each step comprising removing a duration no greater than the selected number of pitch periods; and
a user interface operable to communicate the audio stream for presentation to a user.

15. The communication apparatus of claim 14, wherein the processor is further operable to apply an autocorrelation calculation to the voice samples to determine the pitch period.

16. The communication apparatus of claim 14, wherein the network interface is further operable to receive a voice parameter calculated at a remote location and the processor is further operable to determine the pitch period from the voice parameter.

17. The communication apparatus of claim 14, wherein the processor is further operable to remove the portion of the audio stream in a series of steps, each step comprising removing a portion of the audio stream having a duration less than a selected number of pitch periods.

18. The communication apparatus of claim 14, wherein the processor is further operable to determine a maximum decrease in the capacity of the jitter buffer based on network parameters, and the duration of the removed portion of the audio stream is a greatest integer multiple of the pitch period less than the maximum decrease.

19. A voice communication system, comprising:
means for receiving, from a source at a network endpoint, an audio stream comprising a plurality of voice samples stored in electronic form;
means for determining a pitch period associated with the audio stream;
means for storing the audio stream in a jitter buffer comprising a capacity;
means for increasing the capacity of the jitter buffer by an integer multiple of the pitch period;
means for inserting additional audio data based on the voice samples in the audio stream, the additional audio data having a duration equal to the integer multiple of the pitch period;
means for determining if the increase in the capacity of the jitter buffer exceeds a selected number of pitch periods;
if the increase exceeds the selected number of pitch periods, means for inserting the additional audio data in more than one step, each step comprising inserting a portion of additional audio data having a duration no more than the selected number of pitch periods; and
means for communicating the audio stream for presentation to a user.

20. A method for concealing audible distortions resulting from jitter buffer expansion, comprising:
receiving an audio stream;
determining a pitch period associated with the audio stream;
storing the audio stream in a jitter buffer comprising a capacity;
calculating a minimum increase in the capacity of the jitter buffer based on network parameters;
increasing the capacity of the jitter buffer by a least integer multiple of the pitch period greater than the minimum increase;
inserting additional audio data in the audio stream, the additional audio data having a duration corresponding to the least integer multiple of the pitch period; and
communicating the audio stream for presentation to a user.

21. A method for concealing audible distortions resulting from jitter buffer contraction, comprising:
receiving an audio stream;
determining a pitch period associated with the audio stream;
storing the audio stream in a jitter buffer comprising a capacity;
determining a maximum decrease in the capacity of the jitter buffer based on a change in network parameters;
removing a portion of the audio stream having a duration corresponding to an integer multiple of the pitch period, the duration of the removed portion of the audio stream is a greatest integer multiple of the pitch period that is less than the maximum decrease;
decreasing the capacity of the jitter buffer by the integer multiple of the pitch period; and
communicating the audio stream for presentation to a user.

22. A communication apparatus, comprising:
a network interface operable to receive an audio stream;
a memory operable to store the audio stream in a jitter buffer comprising a capacity;
a processor operable to determine a pitch period for the audio stream, to remove a portion of the audio stream having a duration corresponding to an integer multiple of the pitch period, to decrease the capacity of the jitter buffer by the integer multiple of the pitch period, and to determine a maximum decrease in the capacity of the jitter buffer based on network parameters, the duration of the removed portion of the audio stream is a greatest integer multiple of the pitch period less than the maximum decrease; and
a user interface operable to communicate the audio stream for presentation to a user.

* * * * *